Jan. 2, 1951      L. H. HUTCHISON      2,536,371
COMBINED PAYROLL CHECK AND TIMECARD
Filed May 13, 1947      2 Sheets-Sheet 1

Inventor
Leon H. Hutchison

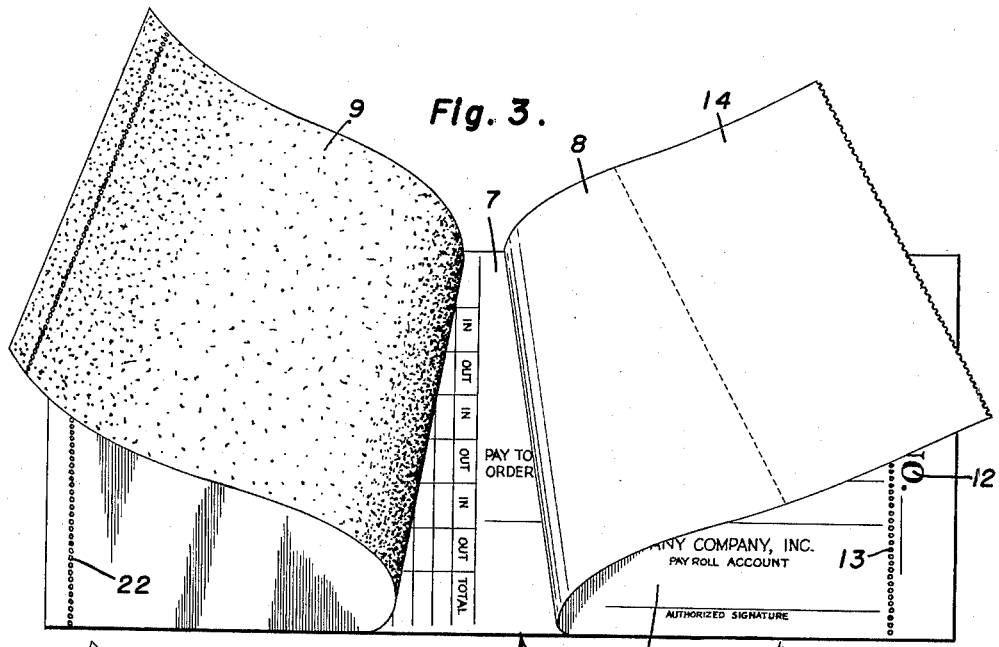
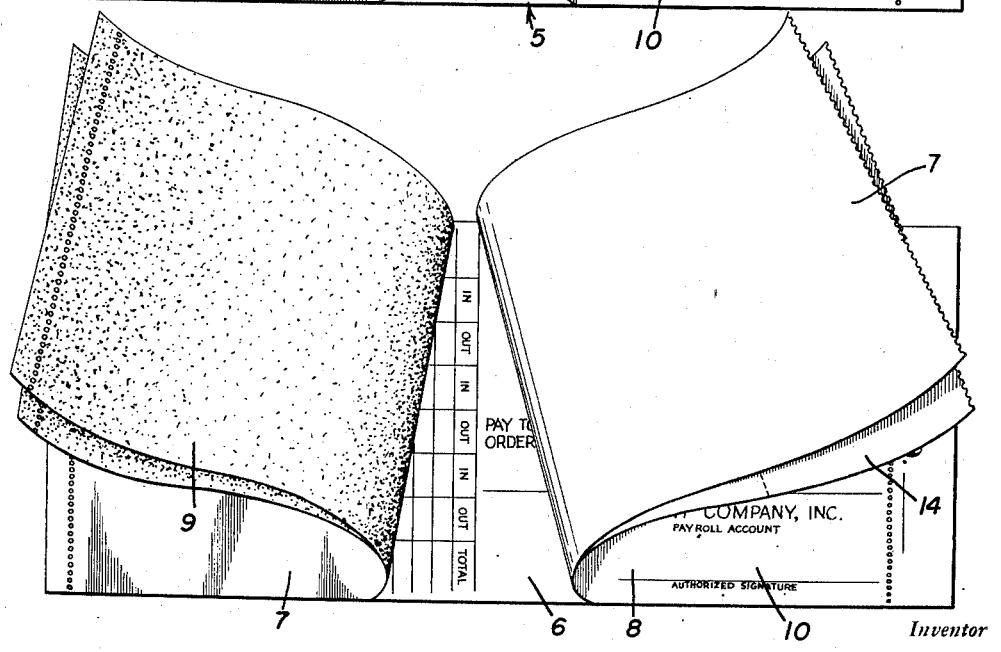

Patented Jan. 2, 1951

2,536,371

UNITED STATES PATENT OFFICE 2,536,371

COMBINED PAYROLL CHECK AND TIMECARD

Leon H. Hutchison, New Orleans, La.

Application May 13, 1947, Serial No. 747,691

3 Claims. (Cl. 282—23)

The present invention relates to new and useful improvements in record sheets for the recording of data pertaining to the pay of employees in factories or other establishments where a large number of workers are employed and the invention relates more particularly to a combined payroll check and time card.

An important object of the present invention is to provide a time record card on which the various work periods of an employee are recorded by him through the medium of a time clock and to combine with such time card or record a check covering the amount earned by said employee so that the check together with a record of the accumulated time is delivered to the employee at the completion of each pay period.

A further object of the invention is to provide a severable tab for the combined payroll check and time card upon which the basis of pay is computed as well as the several items of deductions to which the employee is subjected and which the employee may detach from the payroll check to preserve as part of his record before cashing the check.

Another object of the invention is to provide a combined payroll check and time card embodying the aforesaid features of the invention and constructed in pad form by means of which duplicate records may be made of each entry appearing on the top record sheet of the pad.

A further object of the invention is to provide a record sheet of this character whereby considerable time is saved in the usual preparation of payroll checks and which eliminates many tedious and time consuming steps usually employed in present systems of keeping payroll records and at the same time reduces the chance of error in such systems where the transcription of the record from one sheet to another is practiced.

A still further object is to provide an article of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the pad of record sheets forming the combined payroll check and time card;

Figure 2 is an edge elevational view thereof;

Figure 3 is a plan view showing the original record sheet folded back to disclose one of the carbon copies of the pad;

Figure 4 is a similar view with the original and first carbon copy folded back to disclose the second carbon copy carried by the rigid backing sheet of the pad;

Figure 5 is a plan view of the combined payroll check and time card separated from the pad, and;

Figure 6 is a similar view showing the tab containing the employee's computed pay record and deductions removed from the combined payroll check and time card.

Referring now to the drawings in detail, wherein for the purpose of illustration I have disclosed a preferred embodiment of the invention the numeral 5 designates a manifold pad generally and which is composed of a substantially stiff paper backing sheet 6, an intermediate paper sheet 7 and a top paper sheet 8.

The sheets 6, 7 and 8 are coextensive in area and are of substantially rectangular form and have their end edges cemented or otherwise suitably secured to each other. Between the backing sheet 6 and the intermediate sheet 7 and the top sheet 8 are sheets of carbon paper 9 whereby data recorded on the top sheet 8 will be duplicated on the intermediate sheet 7 and on the backing sheet 6.

Each of the sheets 6, 7 and 8 is printed in an identical manner to provide a blank check 10 at one end of each of the sheets at the left-hand portion of which are ruled horizontal columns 11 to provide a time card on which the time that an employee begins and stops work is stamped in the usual manner by a conventional time clock. At the right-hand end of the sheet space is provided for the time clock number of the employee as shown at 12. A line of perforations 13 punched through all of the sheets as well as through the carbon sheets 9 separate the time clock identification number 12 from the blank check 10.

At the left-hand end of each of these sheets is printed a blank form 14 upon which various data is recorded relating to the sum earned by the employee, such as the work period as shown at 15, the total hours and the rate of pay indicated at 16, the overtime shown at 17 and the amount of pay earned totaled opposite the same and shown at 18.

Beneath such data is listed the various items of deductions to be with-held from the amount earned as shown at 19 and beneath which is indicated the net pay 20.

A score line 21 separates the tab 14 from the combined payroll check and time card and a line of perforations 22 separates the tab 14 from the united left-hand ends of the sheets forming the pad.

In the use of the invention, one of the printed pads 5 comprising the record sheets 6, 7 and 8 and with the carbon sheets 9 interposed therebetween, is assigned to each of the employees who records on the time card portion 11 thereof the length of time worked each day through the use of a conventional time clock. At the end of the work period the net pay earned by the employee is computed on the tab 14 and the blank check 10 made out accordingly.

The upper sheet 8 is then separated from the pad at each end along the perforations 13 and 22 and presented to the employee. Before cashing the check the tab 14 is separated therefrom along the fold line 21 and the tab 14 containing all information on which the pay check is based is kept by the employee for his record.

The first and second carbon copies 7 and 6 respectively containing identical information as that of the top sheet 8 is retained by the employer for use in a desired manner in computing production costs.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A manifold device comprising a plurality of record sheets having carbons therebetween, the back sheet being relatively stiffer, and means uniting the side edges of the sheets, at least said front sheet having identification indicia printed thereon and having first lines of severance entirely thereacross immediately inwardly of the united side edges on each side and a further intermediate line of severance entirely thereacross dividing the portion between said first lines of severance into major and minor sections, the major section being printed as a combined check and time card and the minor section being printed as a pay computation tab.

2. A manifold device comprising a plurality of record sheets having carbons therebetween, the back sheet being relatively stiffer, and means uniting the side edges of the sheets, said front sheet having identification indicia printed thereon and having an intermediate line of severance entirely thereacross dividing the portion between the united edges into major and minor sections, the major section being printed as a combined check and time card and the minor section being printed as a pay computation tab.

3. A manifold device comprising three record sheets having carbons therebetween, the back sheet being relatively stiffer, and means uniting the side edges of the sheets, said front sheet having identification indicia printed thereon, each sheet having first lines of severance entirely thereacross immediately inwardly of the united side edges on each side and at least the front sheet having a further intermediate line of severance entirely thereacross dividing the portion between said first lines of severance into major and minor sections, the major section being printed as a combined check and time card and the minor section being printed as a pay computation tab.

LEON H. HUTCHISON.

REFERENCES CITED

The following references are of record in the file of this patent:

UNITED STATES PATENTS

| Number | Name | Date |
| --- | --- | --- |
| 1,184,285 | Ward | May 23, 1916 |
| 2,301,482 | Uhl | Nov. 10, 1942 |
| 2,310,394 | Case | Feb. 9, 1943 |

FOREIGN PATENTS

| Number | Country | Date |
| --- | --- | --- |
| 5,715 | Great Britain | 1887 |